United States Patent
Yu (10) Patent No.: US 7,399,322 B2
(45) Date of Patent: Jul. 15, 2008

(54) METHOD OF MAKING POROUS POLYMERIC SEPARATOR AND LITHIUM ION POLYMER BATTERY

(75) Inventor: Si-chul Yu, Goyang-si (KR)

(73) Assignee: BPS Co., Ltd, Gyeonggi-do (KR)

( * ) Notice: Subject to any disclaimer, the term of this patent is extended or adjusted under 35 U.S.C. 154(b) by 555 days.

(21) Appl. No.: 10/753,633

(22) Filed: Jan. 7, 2004

(65) Prior Publication Data
US 2005/0005431 A1    Jan. 13, 2005

(30) Foreign Application Priority Data
Jul. 8, 2003    (KR) .................... 10-2003-0046205

(51) Int. Cl.
*H01M 10/04* (2006.01)
*B05D 5/00* (2006.01)
(52) U.S. Cl. .................... 29/623.5; 427/245
(58) Field of Classification Search .............. 29/623.2, 29/623.3, 623.4, 623.5; 427/245, 246
See application file for complete search history.

(56) References Cited

U.S. PATENT DOCUMENTS

| 5,681,357 | A | 10/1997 | Eschbach et al. | ............ | 29/623.5 |
| 6,780,207 | B1 * | 8/2004 | Han et al. | .................... | 29/623.3 |
| 6,793,692 | B2 * | 9/2004 | Sato et al. | ................... | 29/623.5 |
| 6,884,547 | B2 * | 4/2005 | Mori et al. | ............. | 29/623.5 X |
| 2003/0064286 | A1 * | 4/2003 | Yoshida et al. | ......... | 29/623.2 X |

FOREIGN PATENT DOCUMENTS

WO    WO 01/89022 A1    11/2001

* cited by examiner

*Primary Examiner*—Stephen J. Kalafut
(74) *Attorney, Agent, or Firm*—Bacon & Thomas, PLLC

(57) ABSTRACT

The present invention relates to a method of making a polymeric porous separation membrane for a lithium ion polymer battery, the method comprising: providing a porous polyolefin membrane and a polymer solution of the concentration of 1–20 weight % in an organic solvent fabricated by dissolving in an organic solvent a polymer compound that is stable in an electrolyte containing a lithium salt and can be gelled in the electrolyte, at the temperature of 10–40° C.; and fabricating a polymeric porous separation membrane by coating the polymeric porous polyolefin membrane with the polymer solution. Thus, the porous separation membrane for a lithium ion polymer battery is fabricated by using the polymer solution fabricated at the low temperatures of 10–40° C., and the size of the pores of the coated is proper, so that the containing capacity of the electrolyte and the ion conductivity are good. Further gelling at low pressure is enabled and cohesive force to the electrodes is improved. In the lithium ion battery containing the porous separation membrane, the gelling is accomplished at atmospheric pressure or at low pressure for a few hours, so that problems caused by gelling for a short period at high pressure and high temperature such as the non uniform gelling of the battery, the deformation of the separation membrane and the weakened cohesion can be avoided. Moreover, the high-rate discharge, the cycle life becomes excellent.

3 Claims, 12 Drawing Sheets

METHOD OF MAKING POROUS POLYMERIC SEPARATOR AND LITHIUM ION POLYMER BATTERY

CROSS-REFERENCE TO RELATED APPLICATION

This application claims the benefit of Korean Patent Application No. 2003-046205, filed on Jul. 08, 2003, in the Korean Intellectual Property Office, the disclosure of which is incorporated herein by reference.

BACKGROUND OF THE INVENTION

1. Field of the Invention

The present invention relates to a method of making porous polymeric separation membrane for a lithium ion polymer battery and the lithium ion polymer battery containing the same, and more particularly to a method of making a polymeric porous separation membrane fabricated by gelling polymer and inorganic material on a porous polyolefin membrane and making a lithium ion polymer battery fabricated by using the above method of making a polymeric porous separation membrane having a good cycle life, a good retention of capacity at high rate discharge and an excellent characteristics for safety 2. Description of the Related Art Recently, the electric, electronic, communication and computer industries have been rapidly developed, which has increased demand for secondary batteries that have high qualities and safeties. Especially, electric or electronic products tend to become smaller, thinner and more adequate to be carried and this tendency brings demand for smaller and thinner secondary batteries, the core component of the above electric or electronic products.

Currently, a lithium ion battery is used in a portable device and an electronic product. In the lithium ion battery, a porous film made of polyethylene or polypropylene is used as a separation membrane. To fabricate the lithium ion battery, electrodes and the separation membrane are wound and put in a cylinder shaped case or a rectangular shaped case, as it is difficult to flatly laminate the electrodes and the separation membrane. The rectangular shaped lithium ion battery fabricated by being wound as described above is commercially used but is complicated to fabricate and restricted by shape, so that it is limited for the battery to become thinner and to have more capacity. Thus, a lithium polymer battery is suggested as an alternative for the lithium ion battery; the lithium polymer battery is fabricated by a solid polymeric electrolyte available to be employed as the separation membrane and an electrolyte. Thus, according to kind of the electrolyte, the solid polymeric electrolyte and the electrodes can be not only flatly laminated but also be wound, thereby increasing productivity.

A conventional solid polymeric electrolyte is made usually of polyethyleneoxide, but it has very low conductivity of about $10^{-8}$ S(Siemens)/cm at normal temperature, so that it is not proper to be exclusively used. To solve the above problem, a polymeric electrolyte in a gel form was developed to have the conductivity of $10^{-3}$ S/cm. The representative polymeric electrolyte in a gel form is composed of polyacrylonitile disclosed in American U.S. Pat. No. 5,219,679, The gelled polymeric electrolyte disclosed in American U.S. Pat. No. 5,219,679 has a high conductivity and a strong cohesive force to the electrodes, but a low mechanical strength, so that it has a difficulty in being practically used.

A polymer compound of polyvinylideneflouride(PvdF) in a hybrid form was disclosed in American U.S. Pat. Nos. 5,296,319 and 5,460,904 by Gozdz, which attempted a mass-production of the lithium polymer battery in the hybrid form. However, to produce the above the lithium polymer battery, a plasticizer should be added to fabricate the solid polymeric electrolyte, an anode and a cathode, thereby causing a difficulty in fabricating the battery, as the plasticizer should be extracted later. Further, the PvdF electrolyte has a high mechanical strength, but weak cohesive force, so that the fabrication of the battery requires a process making layers thinner by heat at high temperature. Further, the electrodes and the gelled polymeric electrolyte are exfoliated in the extracting process, which causes a drop of quality of the battery.

Thus, the requirement to fabricate the battery by using the gel electrolyte cannot be accomplished by using exclusively the gel electrolyte having a low mechanical strength. To solve the above problem, Korean patent no. 2000-7004714 discloses a method to coat the electrodes with the gel electrolyte. However, the method to coat the electrodes with the gel electrolyte has difficulty in generalization, as the fabrication process should be accomplished under an inert air condition, so that it is difficult to control the process.

American U.S. Pat. Nos. 5,681,357, 5,688,293 and 5,834,135 disclose methods as follows: a solution in which polymer such as PvdF is dissolved in a solvent or in an organic solvent is applied to a polypropylene or polyethylene separation membrane used for the lithium ion battery. Then, the above membrane is dried and the dried membrane and the electrodes become thin layers by heat to be united. Thereafter, the organic electrolyte is inserted therein to fabricate the battery. The above method has a weak point that the polypropylene or polyethylene separation membrane may be deformed or pores of the separation membrane may be closed, as a polymeric solution of high concentration is cast in the polypropylene or polyethylene membrane. Further, the contact between the electrodes and the separation membrane are not sufficient, as the electrodes and the separation membrane are united by heating process to become thin layers, thereby causing a low high-rate charge/discharge property and a short cycle life. Thus, this method is hardly used.

Also American U.S. Pat. No. 5,853,916 discloses a process as follows to solve the problem: A cell is fabricated by coating a polyolefin porous separation membrane with polymer, which is followed by a gelling process at a predetermined temperature and pressure. However, the above method has a problem that a partial electrode position may be occurred at edges, because, to fabricate the battery in a wound form, a high pressure should be exerted on the battery in a vertical direction at a high temperature, so that a pressure in a horizontal direction is relatively lower. Further, the high-rate charge/discharge property of the battery and a cycle property are reduced, as a path of ion conduction is limited to the gel electrolyte. This method is not commercially used any more.

SUMMARY OF THE INVENTION

Accordingly, it is an aspect of the present invention to provide a method of making a polymeric porous separation membrane fabricated by gelling polymer and inorganic material on a porous polyolefin membrane and making a lithium ion polymer battery fabricated by using the above method of making a polymeric porous separation membrane having a good cycle life, good retention of capacity at high rate discharge and a excellent characteristics for safety.

Additional aspects and/or advantages of the invention will be set forth in part in the description which follows and, in part, will be obvious from the description, or may be learned by practice of the invention.

The foregoing and/or other aspects of the present invention are achieved by providing a method of making a polymeric porous separation membrane for a lithium ion polymer battery, the method comprising: providing a porous polyolefin membrane and a polymer solution of the concentration of 1–20 weight % fabricated by dissolving a polymer compound that is stable in an electrolyte containing a lithium salt and can be gelled in the electrolyte, in an organic solvent at temperatures of 10–40° C.; and fabricating a polymeric porous separation membrane by coating on the porous polyolefin membrane with the polymer solution.

According to an aspect of the invention, the polymer coated on the porous polyolefin separation membrane has pores having the sizes of 0.1–20 μm.

According to an aspect of the invention, the polyolefin membrane is selected from the group consisting of a polyethylene membrane, a polypropylene membrane, and a multi-layer membrane comprising a polyethylene membrane and a polypropylene membrane.

According to an aspect of the invention, an inorganic material is added to the polymer solution in the process of fabricating the polymer solution.

According to an aspect of the invention, the inorganic material is one or more material selected from the group consisting of $SiO_2$, $TiO_2$, $ZrO_2$, $Al_2O_3$, $BaTiO_3$, $Bi_2O_3$, $Fe_2O_3$, $CaSiO_3$, and $PbTiO_3$.

According to an aspect of the invention, the inorganic material is added to the polymer solution by the concentration of 0.1–15 weight % to polymer in solution.

The foregoing and/or other aspects of the present invention are achieved by providing a method of making a lithium ion polymer battery comprising: fabricating a cathode and an anode; providing a porous polyolefin membrane and a polymer solution of the concentration 1–20 weight % fabricated by dissolving in an organic solvent a polymer compound that is stable in a electrolyte containing a lithium salt and can be gelled in the electrolyte, at the temperature of 10–40° C.; and fabricating a polymeric porous separation membrane by coating on the porous polyolefin membrane with the polymer solution; fabricating a battery structure by using the cathode, the polymeric porous membrane and the anode; injecting a liquid electrolyte containing a lithium salt into an aluminum pouch including battery structure; sealing and gelling package at the temperature of 70–100° C., at the pressure of the atmospheric pressure—10 lbs/$cm^{2,}$ for 1–48 hours.

According to an aspect of the invention, the polymer coated on the porous polyolefin separation membrane has pores having sizes of 0.1–20 μm.

The foregoing and/or other aspects of the present invention are achieved by providing a method of making a lithium ion polymer battery comprising: fabricating a cathode and an anode; providing a porous polyolefin membrane and a polymer solution of the concentrations 1–20 weight % fabricated by dissolving a polymer compound that is stable in an electrolyte containing a lithium salt and can be gelled in the electrolyte, in an organic solvent at temperatures of 10–40° C.; and fabricating a coated cathode by coating on the cathode with the polymer solution; fabricating a coated anode by coating on the anode with the polymer solution; fabricating a battery structure by using the coated cathode, the porous polyolefin membrane and the coated anode; injecting a liquid electrolyte containing a lithium salt into aluminum pouch including battery structure; sealing and gelling package at the temperature of 70–100° C., at the pressure of the atmospheric pressure–10 lbs/$cm^{2,}$ for 1–48 hours.

According to an aspect of the invention, the polymer coated on the porous polyolefin separation membrane has pores having the sizes of 0.1–20 μm.

According to an aspect of the invention, the polyolefin membrane is selected from the group consisting of a polyethylene membrane, a polypropylene membrane, and a multi-layer membrane comprising a polyethylene membrane and a polypropylene membrane.

According to an aspect of the invention, an inorganic material is added to the polymer solution in the process of fabricating the polymer solution.

According to an aspect of the invention, the inorganic material is one or more material selected from the group consisting of $SiO_2$, $TiO_2$, $ZrO_2$, $Al_2O_3$, $BaTiO_3$, $Bi_2O_3$, $Fe_2O_3$, $CaSiO_3$, and $PbTiO_3$.

According to an aspect of the invention, the inorganic material is added to the polymer solution by concentrations of 0.1–15 weight % to polymer in solution.

According to an aspect of the invention, the liquid solvent is one or more material selected from the group consisting of ethylene carbonate, propylene carbonate, dimethyl carbonate, diethyl carbonate, ethylmethyl carbonate, γ-butyrolactone, dimethylsulfoxide, and tetrahydrofuran.

According to an aspect of the invention, the lithium salt is one or more materials selected from the group consisting of $LiPF_6$, $LiAsF_6$, $LiClO_4$, $LiSbF_6$, $LiBF_4$, $LiN(CF_3SO_2)_2$, $LiN(SO_2CF_2CF_3)_2$ and $LiCF_3SO_3$.

BRIEF DESCRIPTION OF THE DRAWINGS

The above and other aspects and/or advantages of the present invention will become apparent and more readily appreciated from the following description of the embodiments, taken in conjunction with the accompanying drawings of which.

DETAILED DESCRIPTION OF THE PREFERRED EMBODIMENT

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1A:
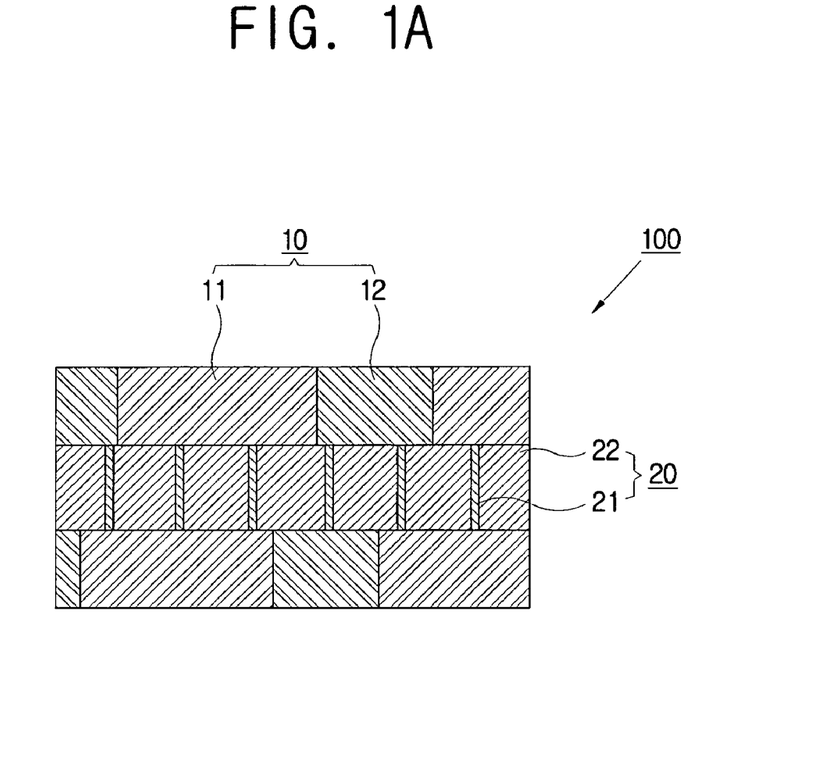
FIG. 1(a) is a sectional view of a polymeric porous separation membrane according to an embodiment of the present invention.

FIG. 1(a) is a sectional view of a polymeric porous separation membrane according to an embodiment of the present invention. As shown herein, a gel-forming polymer layer 10 comprises: pores 11 with the size of 0.1–20 μm and a gel forming polymer matrix 12, A polyolefin membrane 20 is also porous and comprises: pores 21 and a matrix 22, The gel-forming polymer matrix 12 can be gelled, but the matrix 22 of the polyolefin membrane 20 cannot be gelled. If the gel-forming polymer layer 10 has no pore or the size of the pore 11 is smaller than 0.1 μm, the ion conductivity due to a liquid state is reduced. Further, as an adhesion to a electrode is accomplished only in a high pressure, an adhesive force is reduced in the atmospheric pressure or in a low pressure. In contrast thereto, if the pore is larger than 20 μm, a contacting area with the electrode becomes too small, which causes reducing the adhesive force. The size of the pore is varied according to a coating condition. In a process of fabrication of the gel-forming polymer matrix 12, if a polymer solution is fabricated at the temperature of 10–40° C., a containing capacity of an electrolyte becomes greater than that in a gelling process at a high temperature and the adhesive force to the electrode is improved. If the polymer solution is fabricated at the temperatures lower than 10° C., too much fabrication time is required. If the polymer solution is fabricated at the temperatures higher than 40° C., a history remains on a coated polymer chain, which reduces the containing capacity of the electrolyte in a gelling process at a high temperature and the adhesive force.

A lithium ion polymer battery is fabricated as follows. However, the lithium ion polymer battery can be fabricated, if the order to be described later is not followed.

First Process: Fabrication of a Cathode and an Anode

A cathode is fabricated by dissolving a mixture containing 92:5:3 by weight ratio of cathode active material, acetylene black and PvdF in N-methylpyrrolidone at temperatures of 20–60° C.

The cathode active material may comprise one or more materials selected from the group consisting of $LiCoO_2$, $LiMn_2O_4$, $LiNiO_2$, $LiNi_{1-x}Co_xO_2$, and $V_2O_5$. Graphite may be used as conducting material as a substitute for acetylene black.

An anode is fabricated by dissolving a mixture containing 90:2:8 by weight ratio of anode active material, acetylene black and PvdF in N-methylpyrrolidone at the temperatures of 20–60° C.

The anode active material may comprise one or more materials selected from the group consisting of graphite, cokes, hard carbon and tin oxide. Graphite may be used as conducting material as a substitute for acetylene black.

The cathode and anode fabricated as described above may be used as they are or by forming a porous polymeric layer thereon. Here, the porous polymeric layer is formed with the same method as that of a polymeric porous separation membrane (to be described later)

Second Process: Fabrication of a Polymeric Porous Separation Membrane

Polymer is dissolved in an organic solvent at the temperature of 10–40° C. to obtain a polymer solution with 1–20 weight % of polymer. Then a porous polyolefin membrane is dipped in this solution. If the concentration of the polymer solution is lower than 1 weight %, amount of polymer to be coated is too little, so that adhesion is reduced. In contrast to, if concentration of the polymer solution is higher than 20 weight %, a coating thickness is too high, so that it is difficult to be adapted to a battery. Thereafter, the porous polyolefin membrane containing the polymer solution passes through a drier, so that the solvent is evaporated and the porous polyolefin membrane is coated with polymer of the thickness 1–20 μm.

Inorganic material may be added to the above polymer solution. The inorganic material improves in the properties of a battery such as adhesive force and the like, as the inorganic material is available to absorb an electrolyte. If the inorganic material less than 0.1 weight % to polymer in solution is contained in the polymer solution, no significant effect can be expected. If the inorganic material more than 15 weight % is contained in the polymer solution, the polymeric porous separation membrane may be hardened.

The above polymer ingredient is stable in an electrolyte containing lithium salt. A polymer blend mixing one or more materials selected from the group consisting of copolymer with vinylidenefluoride and hexafluoropropylene, polyvinylidenefluoride, polyvinylchloride, polymethylmetacrylate, polymetacrylate, polyvinylalcohol and polyethylene oxide is preferable as a polymer compound available to be gelled in the electrolyte containing lithium salt.

A mixture comprising one or more materials selected from the group consisting of tetrahydrofuran, aceton, acetonitrile, N-methylpyrrolidone, cyclohexanone and chloroform is preferable as the above organic solvent.

The porous polyolefin membrane preferably comprises a polyethylene membrane, a polypropylene membrane or a multi layer consisting of polyethylene membrane and a polypropylene membrane and has a mechanical strength to be wound.

$SiO_2$, $TiO_2$, $ZrO_2$, $Al_2O_3$, $BaTiO_3$, $Bi_2O_3$, $Fe_2O_3$, $CaSiO_3$, $PbTiO_3$ and the like may be used as the above inorganic material.

Third Process: Fabrication of a Lithium Ion Polymer battery

Figure 1B:
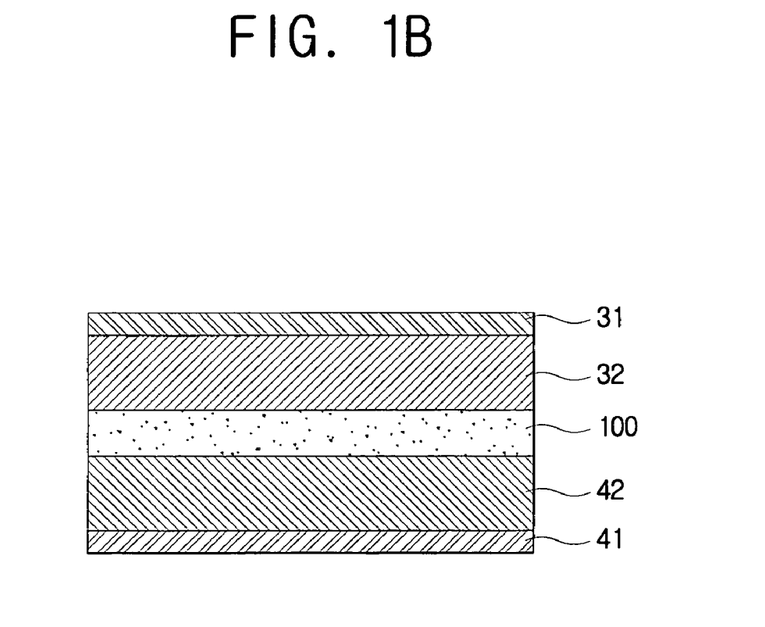
FIG. 1(b) is a sectional view of layers organized with a polymeric porous separation membrane, a cathode and an anode.

FIG. 1(b) is a sectional view of layers piled with a foil 31 on which the anode is applied, the anode 32, a polymeric porous separation membrane 100, the cathode 42, and a foil 41 on which the cathode is applied.

Figure 1C:
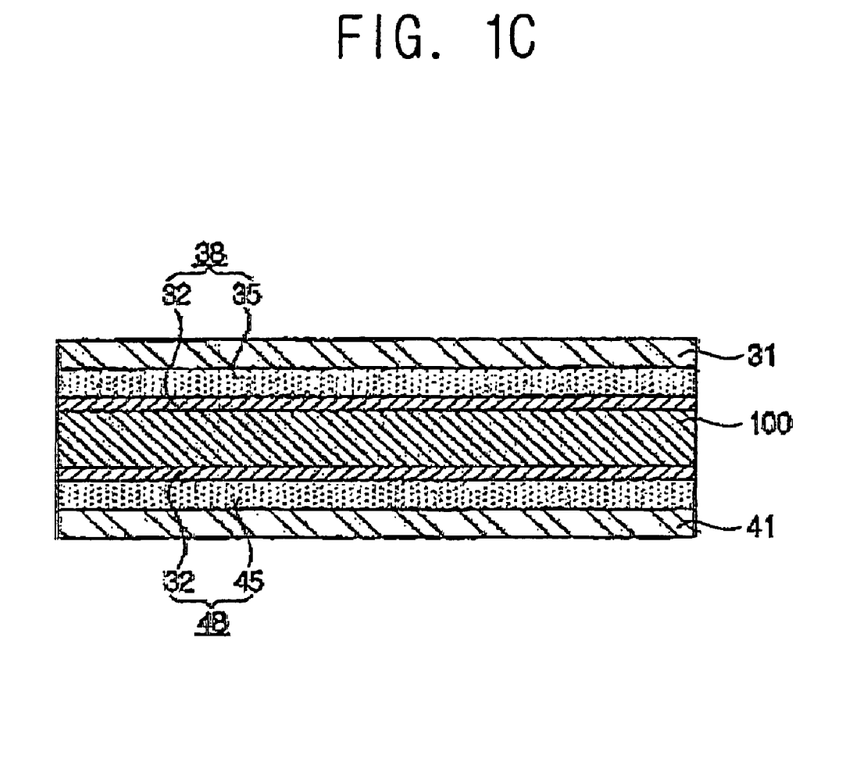
FIG. 1(c) is a sectional view of layers organized with a polymeric porous separation membrane, a coated anode and a coated cathode.

FIG. 1(c) is a sectional view of layers piled with a foil 31 on which the anode 35 is applied, the coated anode 38 formed with a polymeric porous layer 32, a polymeric porous separation membrane 100, the coated cathode 48 formed with a polymer porous layer 32, and a foil 41 on which the cathode 45 is applied.

Figure 2:
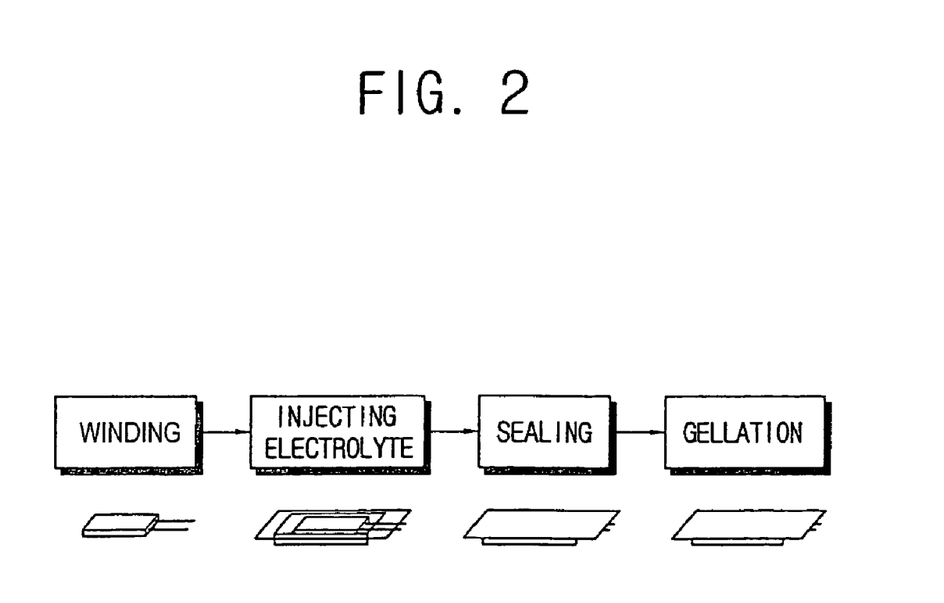
FIG. 2 is a view schematically showing a fabrication process of the lithium ion polymer battery according to an embodiment of the present invention.

FIG. 2 is a view schematically showing a fabrication process of the lithium ion polymer battery according to an embodiment of the present invention.

First, the cathode, the polymeric porous separation membrane, and the anode are piled up one by one. Here, each of the cathode and the anode may be further formed with a polymeric porous layer. If each of the cathode and the anode is formed with a polymeric porous layer, a porous polymeric polyolefin membrane may be used as a substitute for the polymeric porous separation membrane. Then, the above layers are stacked in a vertical direction or layers is wound in a predetermined direction to be wrapped with a foil. Then, a liquid electrolyte containing a lithium salt is injected into an aluminum pouch including a battery structure.

The liquid solvent is one or more material selected from the group consisting of ethylene carbonate, propylene carbonate, dimethyl carbonate, diethyl carbonate, ethylmethyl carbonate, γ-butyrolactone, dimethylsulfoxide, and tetrahydrofuran. Here, the lithium salt is one or more materials selected from the group consisting of $LiPF_6$, $LiAsF_6$, $LiClO_4$, $LiSbF_6$, $LiBF_4$, $LiN(CF_3SO_2)_2$, $LiN(SO_2CF_2CF_3)_2$ and $LiCF_3SO_3$. Next, packing is put in an oven at the temperature of 70° C.–100° C. in pressures of the atmospheric pressure—10 lbs/cm$^2$ for 1–24 hours to be gelled. Thereafter the lithium ion polymer battery is completed. If the gelling temperature is lower than 70° C., gelling is processed in a too low speed. If the gelling temperature is higher than 100° C., pores of the porous polyethylene membrane may be closed. If the gelling pressure is higher than 10 lbs/cm$^2$, gelling may be accomplished not uniformly and the separation membrane may be deformed.

When the stacked and wound battery element is impregnated with the electrolyte solution, the electrolyte is injected into the porous polymeric separation membrane and the electrode. At the polymeric porous separation membrane, the electrolyte is absorbed in the gel-forming polymer and the pore of the polymeric porous membrane. If the electrode are coated with the porous polymeric layer, the electrolyte is absorbed in the pore of the porous gel-forming polymeric layer. In the gelling step, the gel-forming polymer of electrode layer is gelled together with the electrolyte. Without the gelling step, the electrolyte in the pore of the polyolefin or the gel-forming polymer may flow to the outside. However, after the gelling step, the gel-forming polymer is adhered to the electrode, so that the electrolyte is locked in the pore and employed as an ion conductor between the electrodes. The gelling time in the above gelling step relates to the battery of 500–600 mAh. If the gelling time is shorter than 1 hour, gelling of a gelling component is accomplished not completely, so that lack of adhesion is caused and liquid phase and polymer phase separately exists in a cell structure. If the gelling time is longer than 48 hours, energy consumption is too much. Thus, the gelling time is adequately regulated according to a battery system. In an embodiment of the present invention, the preferable gelling time was 5–12 hours.

The present invention is described with the examples attached hereto, but the present invention is not limited to the examples.

First, an example of fabrication of the polymeric porous separation membrane is described.

EXAMPLE 1

Figure 3:
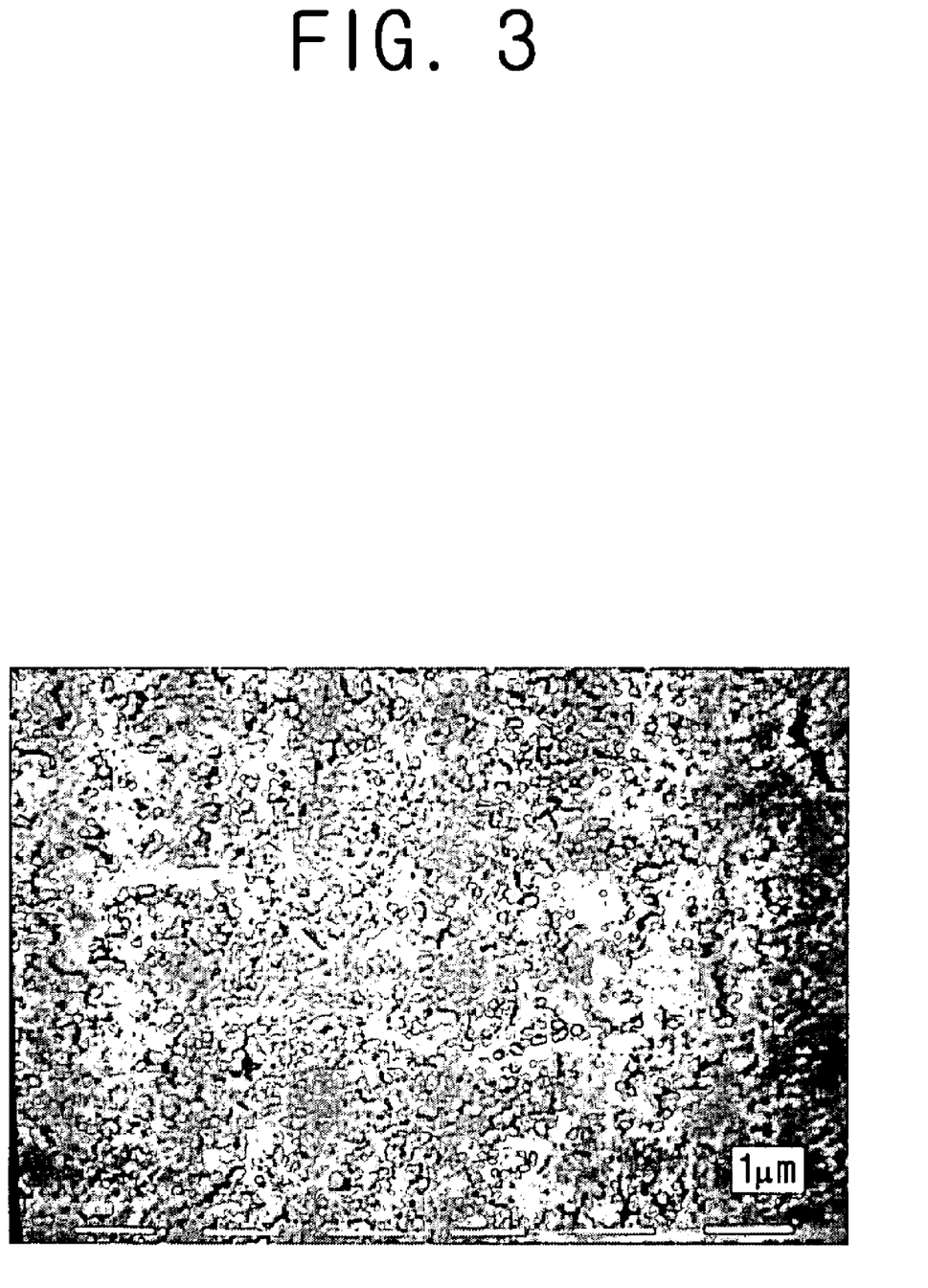
FIG. 3 shows the SEM picture of the porous polyolefin membrane used in an embodiment of the present invention.
Figure 4A:
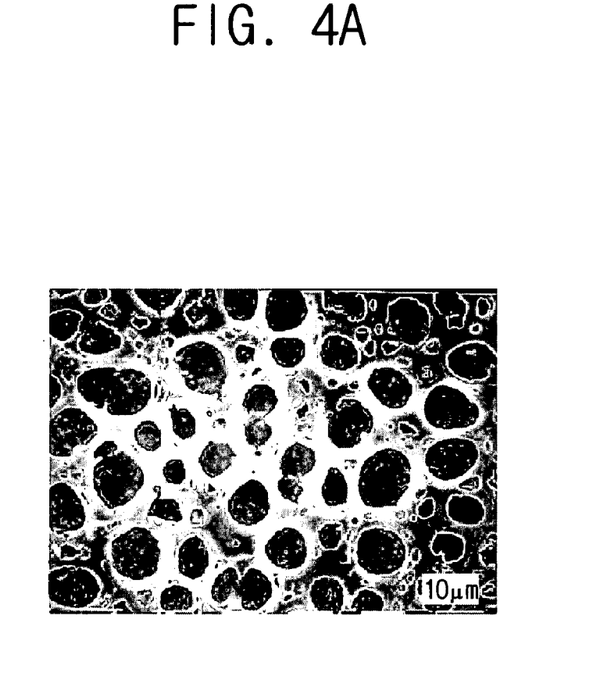
FIG. 4(a) shows the SEM picture of the polymeric porous separation membrane coated with a polymer solution of 3.5 weight %.

3.5 g of copolymer with polyvinylidenefluoride and hexafluoropropylene(PvdF-HFP) as an polymer ingredient was mixed with 96.5 g of tetrahydrofuran as an organic solvent at 30° C. for 12 hours. Then, a porous polyethylene membrane of the thickness 9 μm is dipped in above solution. FIG. 3 shows the SEM picture of the porous polyethylene membrane used in the experiment. The porous polyethylene membrane dipped in the above solution is dried at the temperature of 30° C., thereby fabricating a polymeric porous separation membrane of the thickness 20 μm. FIG. 4(a) shows the SEM picture of the polymeric porous separation membrane. Here, the polymer was formed with pores of the size about 10 μm. Then, the polymeric porous separation membrane is cut by 2×2 cm$^2$ and impregnated in a liquid electrolyte containing lithium salt to take a gelling step at the temperature of 80° C. for 5 hours. Here, the ion conductivity measured at this experiment was $1.2 \times 10^{-3}$ S/cm.

EXAMPLE 2

Figure 4B:
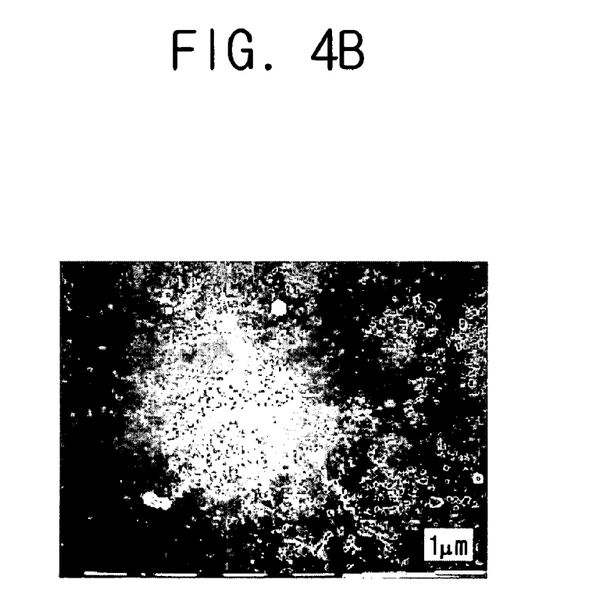
FIG. 4(b) shows the SEM picture of the polymeric porous separation membrane coated with a polymer solution of 2 weight %.

The experiment conditions were the same as those in Example 1, but the amount of polymer was 2 weight %. The thickness of the fabricated separation membrane was 12 μm. FIG. 4(b) shows the SEM picture of the polymeric porous separation membrane, which shows polymer layers scattered. Here, the ion conductivity measured at this experiment was $1.23 \times 10^{-3}$ S/cm.

EXAMPLE 3

Figure 4C:
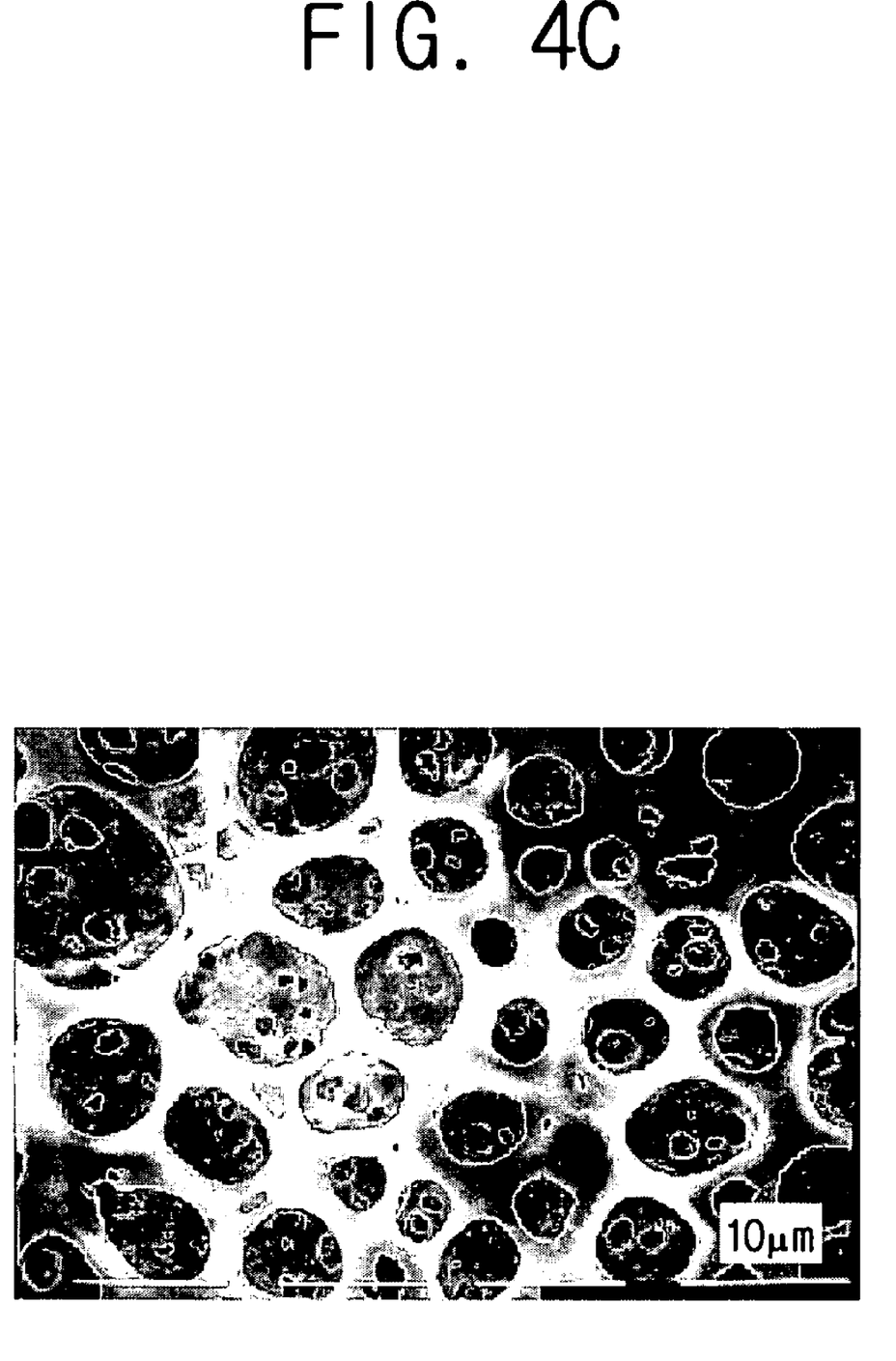
FIG. 4(c) shows the SEM picture of the polymeric porous separation membrane coated with a polymer solution of 5 weight %.

The experiment conditions were the same as those in Example 1, but the amount of polymer was 5 weight %. The thickness of the fabricated separation membrane was 25 μm. FIG. 4(c) shows the SEM picture of the polymeric porous separation membrane, which shows the polymer layer with pores smaller than those of example 1 and formed with a double layer. Here, the ion conductivity measured at this experiment was $1.17 \times 10^{-3}$ S/cm.

EXAMPLE 4

Figure 5:
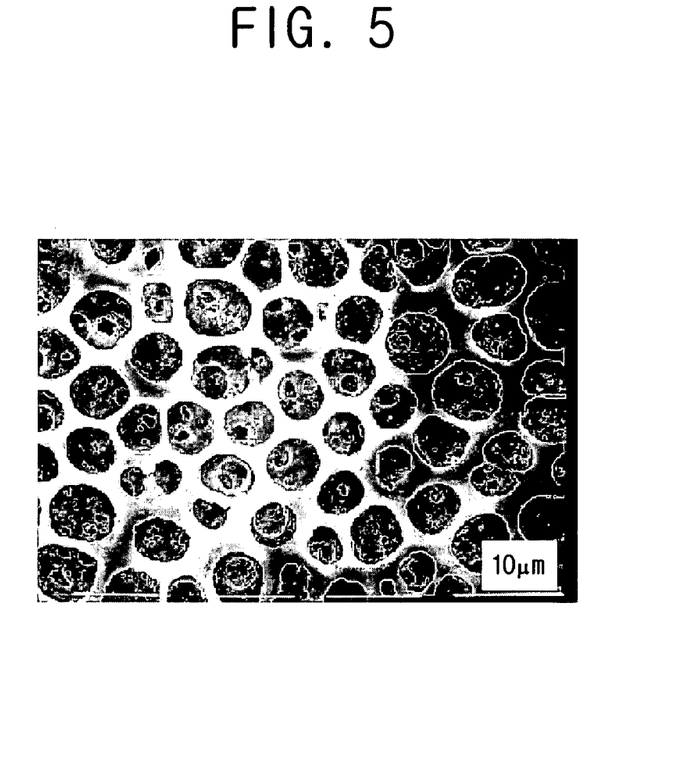
FIG. 5 shows the SEM picture of the polymeric porous separation membrane coated by adding inorganic material, fumed silica, in the polymer solution.

The experiment conditions were the same as those in Example 1, but 0.35 g of fumed silica of the size 7 nm was added to the polymer solution. The thickness of the fabricated separation membrane was 20 μm. FIG. 5 shows the SEM picture of the polymeric porous separation membrane, which shows the polymer layer formed with pores of the size 5–10 μm and having fumed silica distributed in the pores. Here, the ion conductivity measured at this experiment was $1.25 \times 10^{-3}$ S/cm.

Comparison 1

Figure 6:
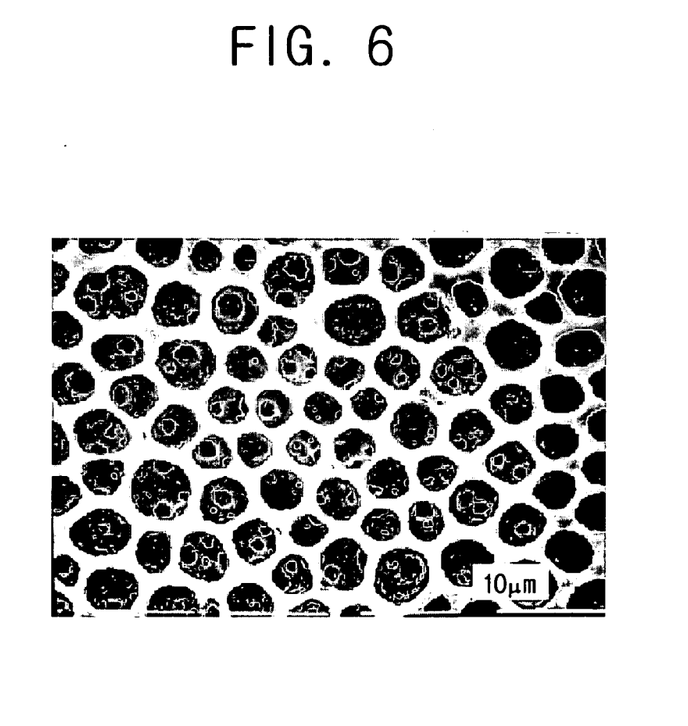
FIG. 6 is the SEM picture of the polymer membrane coated on the polymeric porous separation membrane fabricated with a polymer solution at 50° C.

The experiment conditions were the same as those in Example 1, but the polymer solution was mixed at the temperature of 50° C. FIG. 6 shows the SEM picture of the polymeric porous separation membrane. Here, the ion conductivity measured at this experiment was $1.1 \times 10^{-3}$ S/cm.

Comparison 2

The experiment conditions were the same as those in Example 1, but the polymer solution was mixed at the temperature of 50° C. for 12 hours and porous polyethylene membrane with more tension was dipped in the polymer solution. Pores of nano size were formed. Here, the ion conductivity measured at this experiment was $1.05 \times 10^{-3}$ S/cm.

The above experiments of fabrication of the polymeric porous separation membrane are summarized in table 1.

TABLE 1

Experiments of fabrication of the polymeric porous separation membrane

| | Concentration of polymer solution (%) | Mixing Temperature of polymer solution (° C.) | Size of pores (μm) | Ion Conductivity | Cohesive force to electrode after gelling | The others |
|---|---|---|---|---|---|---|
| Example 1 | 3.5 | 30 | 10 | 1.2 | strong | |
| Example 2 | 2 | 30 | less than 0.1 | 1.17 | weak | |
| Example 3 | 5 | 30 | 10 | 1.17 | strong | |
| Example 4 | 3.5 | 30 | 5–10 | 1.25 | strong | Addition of silica |
| Comparison 1 | 3.5 | 50 | 5–10 | 1.1 | weak | |
| Comparison 2 | 3.5 | 50 | less than 0.1 | 1.05 | weak | Fabrication of nano size pores |

As shown in table 1, if the mixing temperature is 30° C. and the pores of the porous polymeric separation membrane are large, the cohesive force to the electrodes is strong and the conductivity is high. However, in example 2 in which the concentration of polymer solution was 2%, the pores are formed not clearly and the cohesive force was weak. However, when a battery was fabricated in the condition of example 2, the properties of a battery were good. Example 4 shows that the ion conductivity is improved, if fumed silica is added when the polymer solution is fabricated. The cohesive force to the electrodes was measured as follows: the anode and the cathode are cut by 1.5×1.5 cm$^2$ and the porous polymeric separation membrane is inserted therebetween to be gelled under the condition of example 5 (to be described). The cohesive force was measured with the naked eye.

Hereinbelow, examples of fabrication of lithium ion polymer battery are described.

EXAMPLE 5

3.5 g of copolymer with polyvinylidenefluoride and hexafluoropropylene(PvdF-HFP) as an polymer ingredient was mixed with 96.5 g of tetrahydrofuran as an organic solvent at 30° C. for 12 hours. Then, a porous polyethylene membrane of the thickness 9 μm is dipped in the solution fabricated as described above. The porous polyethylene membrane dipped in the above solution is dried at the temperature of 30° C., thereby fabricating a polymeric porous separation membrane. Then, the polymeric porous separation membrane, the cathode, the polymeric porous separation membrane and the anode were piled one by one to be wound. The wound battery element put in an aluminum pouch was impregnated with electrolyte. The electrolyte was made by dissolving LiPF$_6$ in the solvent containing 60:40 by weight ratio of ethylenencarbonate and dimethylcarbonate to get the concentration of 1M. Thereafter, the package was sealed and put into an oven to take a gelling step at the temperature of 80° C. in the atmospheric pressure for 5 hours, thereby completing the lithium polymer battery.

EXAMPLE 6

The experiment conditions were the same as those in Example 5, but the amount of polymer was 2 weight %.

EXAMPLE 7

The experiment conditions were the same as those in Example 5, but the amount of polymer was 5 weight %.

EXAMPLE 8

The experiment conditions were the same as those in Example 5, but 0.35 g of fumed silica of the size of 7 nm was added to the polymer solution.

EXAMPLE 9

The experiment conditions were the same as those in Example 5, but a porous polymeric layer was formed on the cathode and the anode. The thickness of porous polymeric layer coated on the anode and the cathode was 3 μm and 5 μm, respectively.

EXAMPLE 10

The experiment conditions were the same as those in Example 5, but the gelling condition was the temperature of 90° C. and the pressure of 0.4 lbs/cm$^2$.

Comparison 3

The experiment conditions were the same as those in Example 5, but a lithium ion polymer battery was fabricated without the gelling step.

Comparison 4

The experiment conditions were the same as those in Example 5, but the polymer solution was mixed at 50° C. for 12 hours and the porous polyethylene membrane with more tension was dipped in the polymer solution. Pores of the nano size were formed. Here, the gelling conditions were 90° C. and 0.4 lbs/cm$^2$.

Comparison 5

The experiment conditions were the same as those in Example 5, but the gelling conditions of the temperature of 90° C. and the pressure of 50 lbs/cm$^2$ was kept for 2 minutes.

Comparison 6

The experiment conditions were the same as those in the comparison 4, but the gelling conditions of the temperature of 90° C. and the pressure of 50 lbs/cm$^2$ was kept for 2 minutes.

The results of the above experiments are summarized in table 2.

TABLE 2

Conditions of fabrication of the lithium ion polymer battery

| | Fabrication of Polymer solution | | Gelling condition | | | |
|---|---|---|---|---|---|---|
| | Concentration (%) | Temperature (° C.) | Temperature (° C.) | Pressure (lbs/cm$^2$) | Time | The others |
| Example 5 | 3.5 | 30 | 80 | A.P* | 5 h** | |
| Example 6 | 2 | 30 | 80 | A.P | 5 h | |
| Example 7 | 5 | 30 | 80 | A.P | 5 h | |
| Example 8 | 3.5 | 30 | 80 | A.P | 5 h | Addition of silica in polymer solution |
| Example 9 | 3.5 | 30 | 80 | A.P | 5 h | Coating on electrode |
| Example 10 | 3.5 | 30 | 90 | 0.4 | 5 h | |
| Comparison 3 | 3.5 | 30 | — | — | — | Without gelling |
| Comparison 4 | 3.5 | 50 | 80 | 0.4 | 5 h | Pores of nano size |
| Comparison 5 | 3.5 | 30 | 90 | 50 | 2 m*** | |
| Comparison 6 | 3.5 | 30 | 90 | 50 | 2 m | Pores of nano size |

*the abbreviation of "the atmospheric pressure"
**the abbreviation of "hour"
***the abbreviation of "minute"

Table 3 shows the relation between size of pores, pressure and gelling time and cycle life property, cohesive force to electrode.

TABLE 3

Cycle life property and cohesive force to electrodes

| | Size of Pores (μm) | Gelling pressure (lbs/cm$^2$) | Gelling time | Existence of an electrode position after 10 cycles | Cycle Property (300 cycles, 1 C rate) | Cohesive force between electrolyt and electrode |
|---|---|---|---|---|---|---|
| Example 10 | 10 | 0.4 | 5 h* | No electrode position | 93% | Strong |
| Comparison 4 | Less than 0.1 | 0.4 | 5 h | No electrode position | 88% | Weak |
| Comparison 5 | 10 | 50 | 2 m** | Partial electrode position (3) | 84% | only partial cohesion |
| Comparison 6 | Less than 0.1 | 50 | 2 m | Partial electrode position (4) | 82% | Only partial cohesion |

*the abbreviation of "hour"
**the abbreviation of "minute"

As shown in table 3, if the size of pores of the polymeric porous separation membrane is adequate and gelling pressure is low and gelling time is long, the cycle life property and the cohesive force to the electrodes are good.

Hereinbelow, the present invention is detailed described with refer to efficiency experiments of batteries obtained from above experiments.

Figure 7:
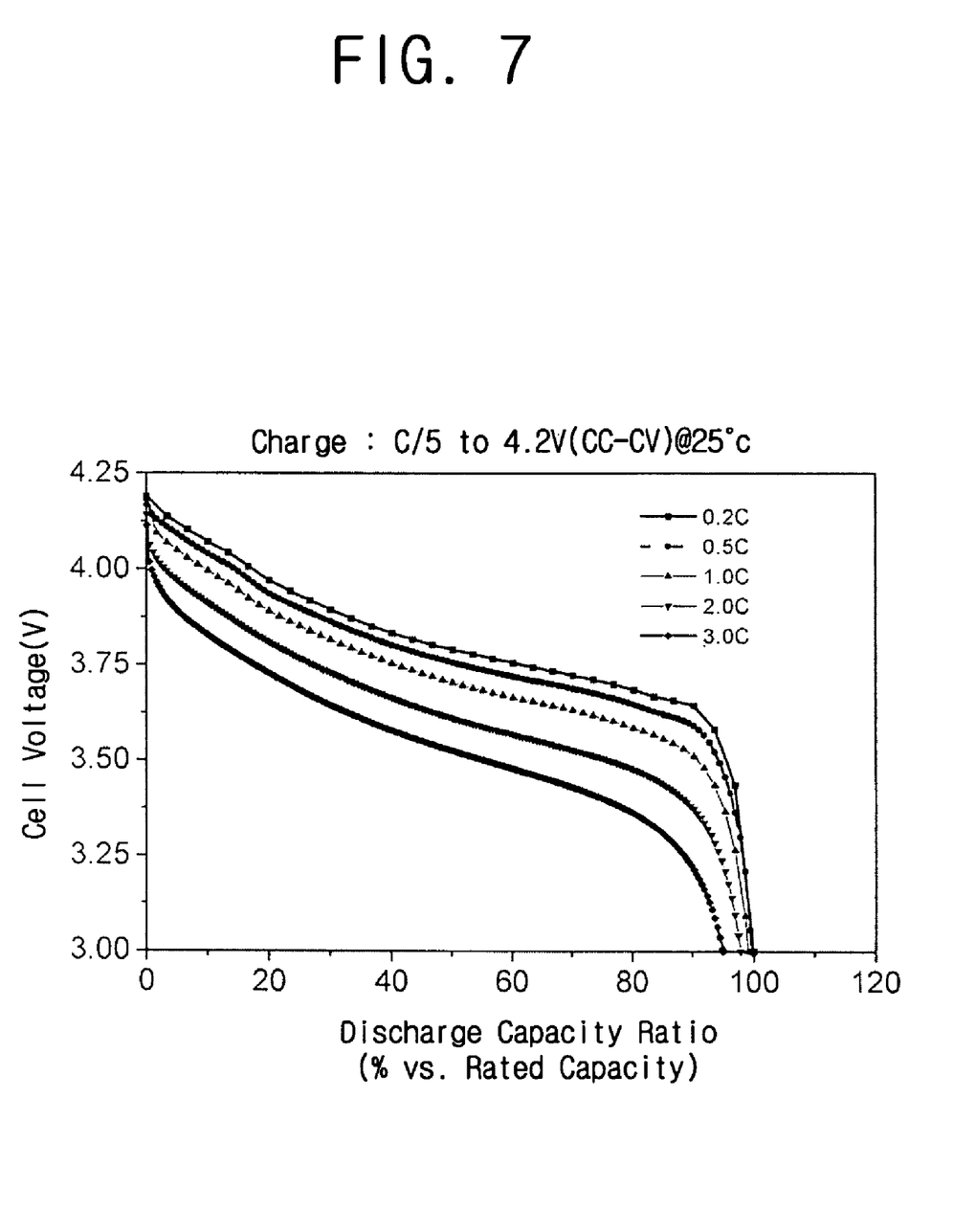
FIG. 7 is a graph showing a high-rate discharge property of the battery fabricated according to example 5.

FIG. 7 shows high-rate discharge property of the battery fabricated according to example 5. Here, the high-rate discharge property was obtained as follows: first, the battery was charged with constant current/constant voltage at 0.5 C, then, discharge capacity is measured according to each of discharge speed, thereafter, ratio of the measured discharge capacity to the discharge capacity at 0.2 C is measured. As shown herein, if the battery is discharged at 3 C, 95% of the discharge capacity at 0.2 C can be obtained. It was because the ion conductivity of the electrolyte is high and the gelling polymer is adhered to the electrodes well, thereby reducing internal resistance.

Figure 8A:
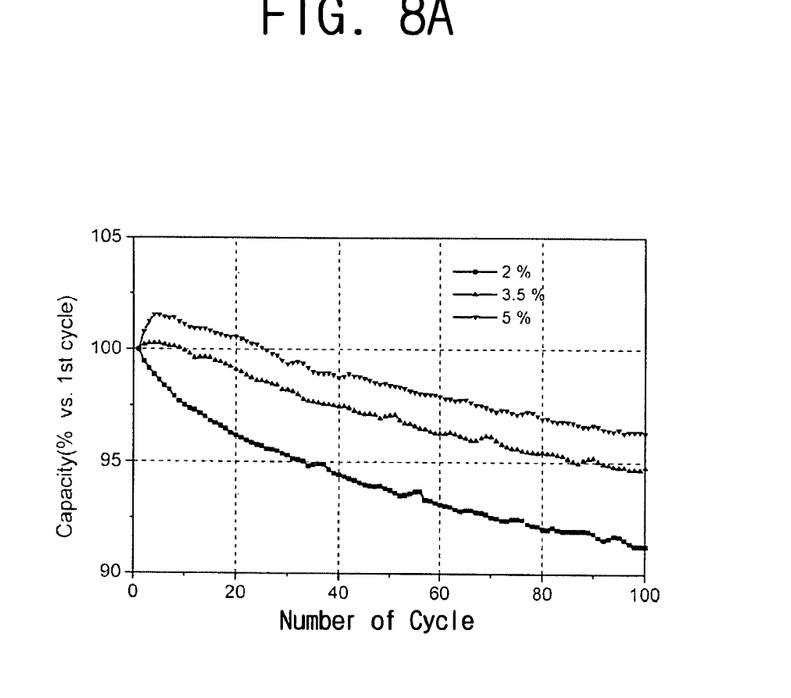
FIG. 8(a) is a graph showing a cycle property of the battery according to a concentration of the polymer solution.
Figure 8B:
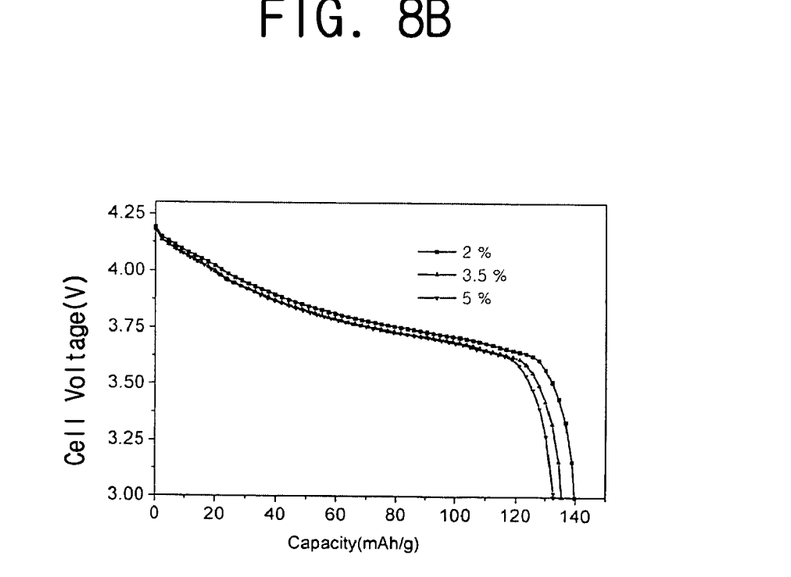
FIG. 8(b) is a graph showing a capacity property of the battery according to a concentration of the polymer solution.

FIGS. 8(a) and 8(b) show the cycle properties and the discharge capacities of the batteries in examples 5 through 7. The cycle property was measured with the discharge capacity at 1 C at test temperature of 25° C. and the capacity property was measured with the discharge capacity at 0.2 C at the test temperature of 25° C. At cycle property, discharge capacity was shown by the capacity of cathode active material and at cycle property, the discharge capacity was shown as ratio against the discharge capacity of the first cycle. The more the polymer is included, the more the cycle property is improved but the less the discharge capacity becomes.

Figure 9:
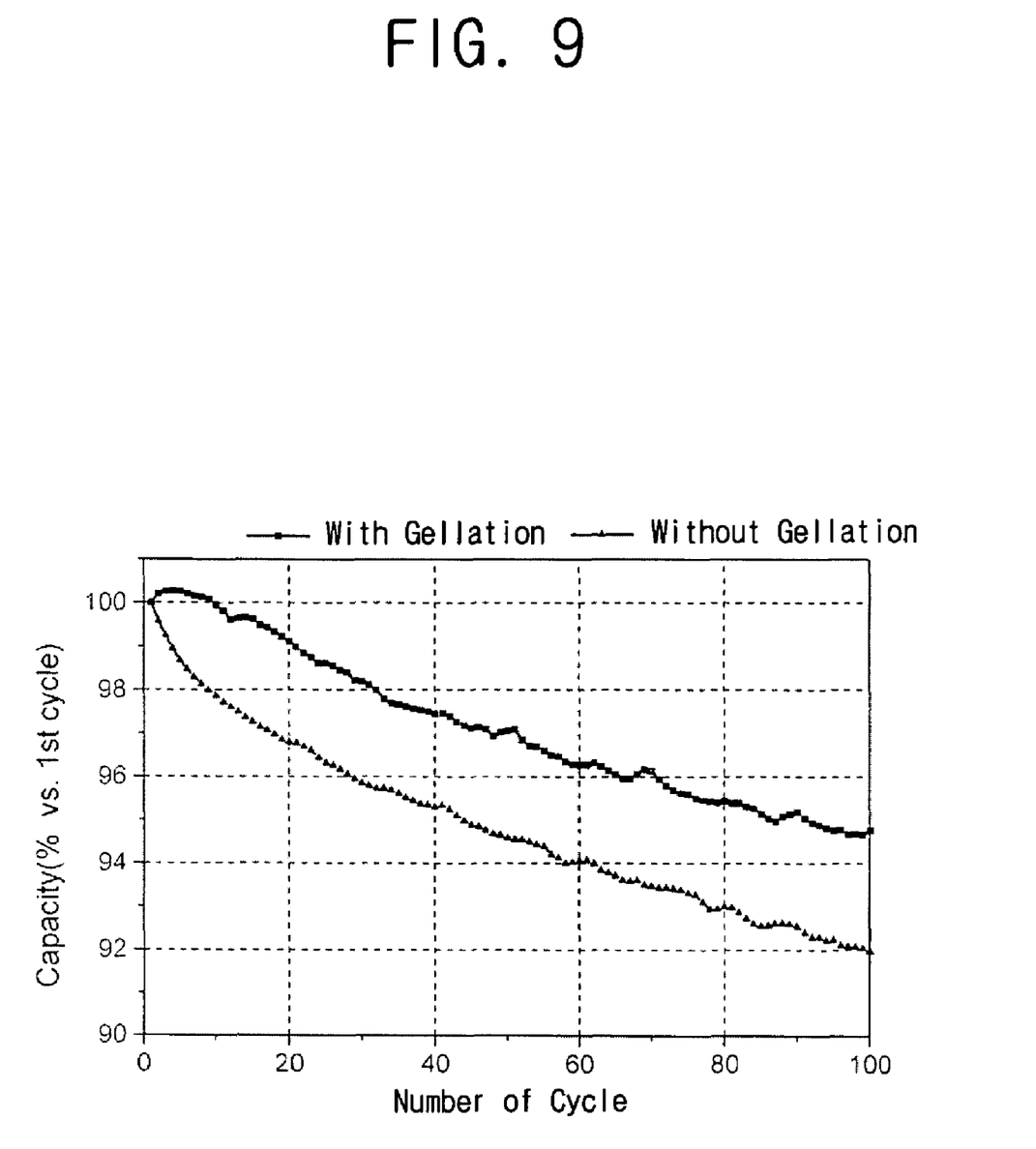
FIG. 9 is a graph showing a cycle property of the battery according to whether a gelling process is accomplished.

FIG. 9 shows the cell cycle property of the lithium ion polymer battery fabricated by using the polymer electrolyte according to comparison 3 and cell cycle property of the lithium ion polymer battery according to example 5. Here, the discharge capacity was shown as ratio against the discharge capacity in the first cycle. As shown herein, the cycle property of the lithium ion polymer battery fabricated without the gelling in comparison 3 is much worse than that of gelling lithium ion polymer battery.

Figure 10:
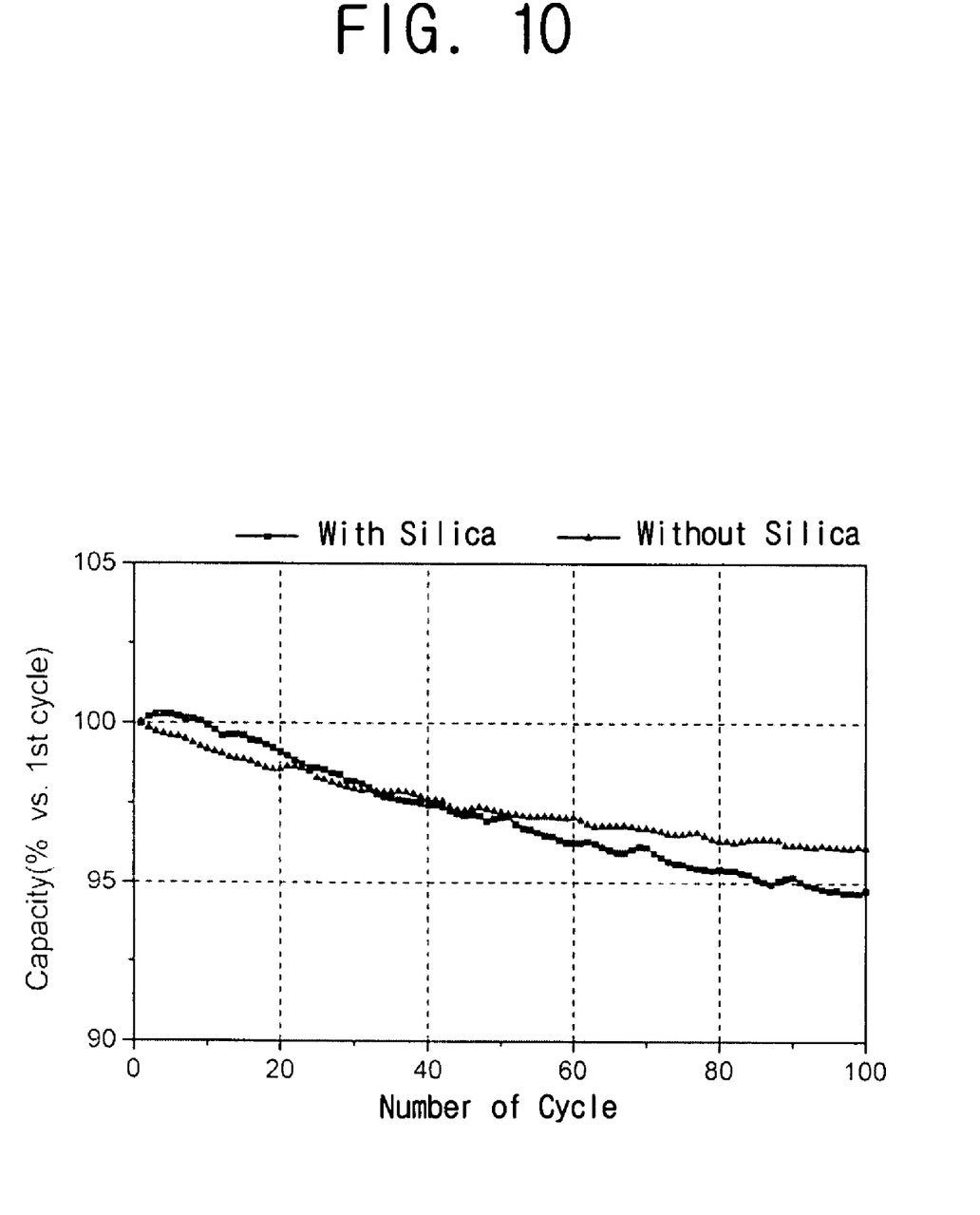
FIG. 10 is a graph showing a cycle property of the battery according to whether an inorganic material is added.

FIG. 10 comparatively shows the results obtained from example 5 and example 8, in which it was a matter whether the inorganic material was added. Here, the cycle properties are measured by alternating between charge and discharge at the temperature of 25° C. and at 1 C. As shown herein, if the inorganic material is added, the cycle is improved. Because, if inorganic material is added, the gelling polymer can contain and keep electrolyte better, which can contribute to keep the cycle.

Figure 11:
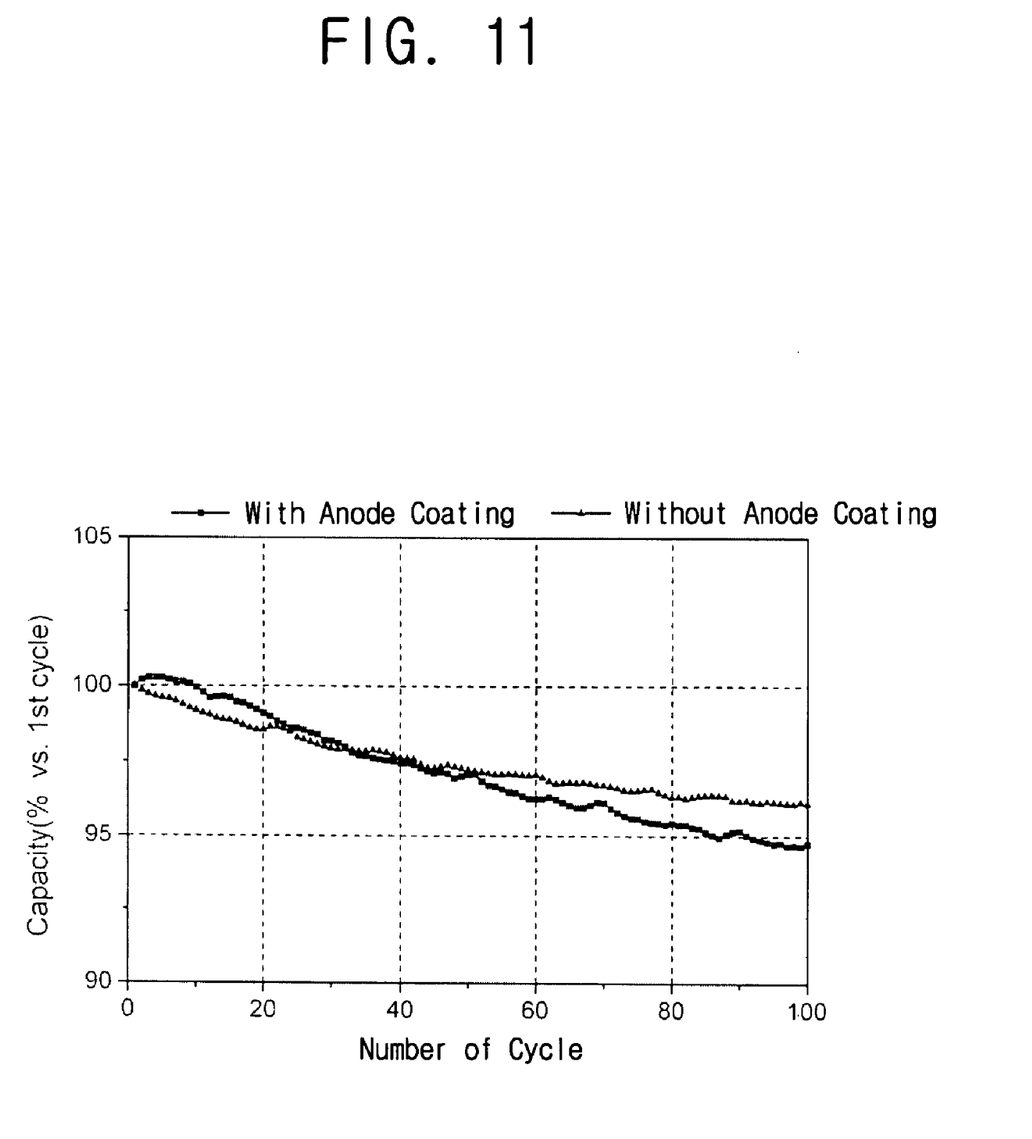
FIG. 11 is a graph showing a cycle property of the battery according to whether polymer is coated on the electrodes.

FIG. 11 comparatively shows example 5 and example 9 in which the polymeric porous layer was coated on the anode. As shown herein, if a polymeric porous layer is coated on the anode, the cycle property is improved.

Figure 12:
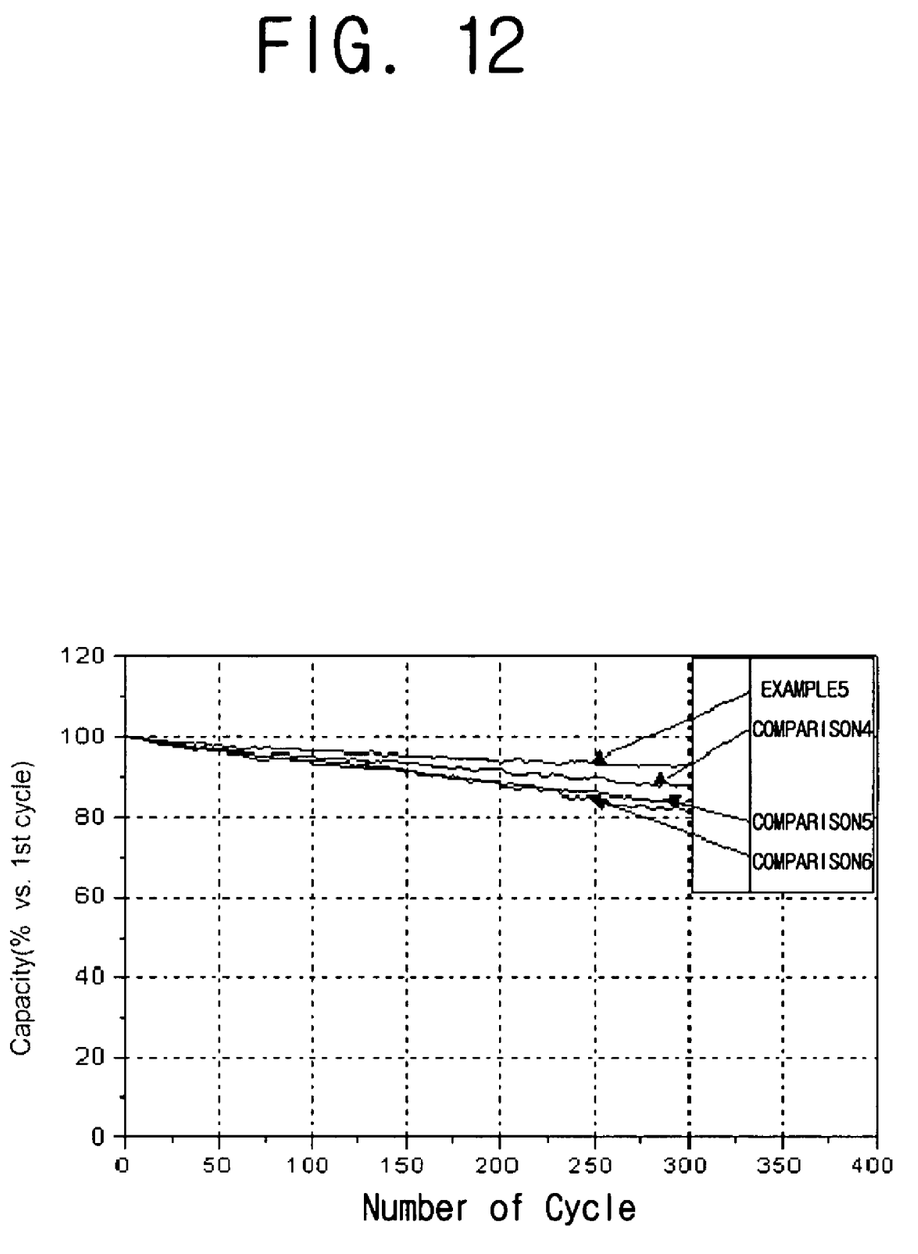
FIG. 12 is a graph comparatively showing a cycle property of the battery according to example 5 and the batteries according to comparisons 4, 5, and 6.

FIG. 12 comparatively shows the cycle properties of example 5 and comparison 4, 5, and 6. As shown herein, the cycle property of the battery according the present invention is 90%, which means the cycle property of the battery according the present invention is better than those in comparisons.

As described above, the porous separation membrane for a lithium ion polymer battery is fabricated by using the polymer solution fabricated at the low temperatures of 10–40° C., and the size of the pores of the coated is proper, so that the containing capacity of the electrolyte and the ion conductivity are good. Further gelling at low pressure is enabled and cohesive force to the electrodes is improved. In the lithium ion battery containing the porous separation membrane, the gelling is accomplished at atmospheric pressure or at low pressure for a few hours, so that problems caused by gelling for a short period at high pressure and high temperature such as the non uniform gelling of the battery, the deformation of the separation membrane and the weakened cohesion can be avoided. Moreover, the high-rate discharge, the cycle life becomes excellent.

Although a few embodiments of the present invention have been shown and described, it will be appreciated by those skilled in the art that changes may be made in these embodiments without departing from the principles and spirit of the invention, the scope of which is defined in the appended.

What is claimed is:

1. A method of making a polymeric porous separation membrane for a lithium ion polymer battery, the method comprising:

providing a porous polyolefin membrane and a polymer solution of the concentration of 1–20 weight % fabricated by dissolving a polymer compound that is stable in an electrolyte containing a lithium salt and can be gelled in the electrolyte, in an organic solvent at the temperature of 10–40° C.; and fabricating a polymeric porous separation membrane by coating a polymer layer having cores having a size of 0.1–20 μm on the porous polyolefin membrane with the polymer solution.

2. A method of making a lithium ion polymer battery comprising:

fabricating a cathode and an anode;

providing a porous polyolefin membrane and a polymer solution of the concentration of 1–20 weight % fabricated by dissolving a polymer compound that is stable in a electrolyte containing a lithium salt and can be gelled in the electrolyte, in an organic solvent at the temperature of 10–40° C.;

fabricating a polymeric porous separation membrane by coating a polymer layer having pores having a size of 0.1–20 μm on the porous polyolefin membrane with the polymer solution;

fabricating a battery structure by using the cathode, the polymeric porous membrane and the anode;

injecting a liquid electrolyte containing a lithium salt into an aluminum pouch including battery structure;

sealing the aluminum pouch, and subjecting the sealed aluminum pouch to a gelling process at a temperature of 70 to 100° C. and under a pressure ranging from atmospheric pressure to 10 lbs/cm$^2$ for 1 to 48 hours.

3. A method of making a lithium ion polymer battery comprising:

fabricating a cathode and an anode;

providing a porous polyolefin membrane and a polymer solution of the concentrations of 1–20 weight % fabricated by dissolving a polymer compound that is stable in a electrolyte containing a lithium salt and can be gelled in the electrolyte, in an organic solvent at the temperature of 10–40° C.;

fabricating a polymeric porous separation membrane by coating a polymer layer having pores having a size of 0.1–20 μm on the porous polyolefin membrane with the polymer solution;

fabricating a coated cathode by coating the cathode with the polymer solution;

fabricating a coated anode by coating the anode with the polymer solution;

fabricating a battery structure by using the coated cathode, the porous polyolefin membrande and the coated anode;

injecting a liquid electrolyte containing a lithium salt into an aluminum pouch including the battery structure;

sealing the aluminum pouch, and subjecting the sealed aluminum pouch to a gelling process at a temperature of 70 to 100° C. and under a pressure ranging from atmospheric pressure to 10 lbs/cm$^2$ for 1 to 48 hours.

* * * * *